(12) United States Patent
Kubota et al.

(10) Patent No.: US 6,650,425 B2
(45) Date of Patent: Nov. 18, 2003

(54) POSITION MEASURING LASER APPARATUS (75) Inventors: Yasushi Kubota, Shizuoka (JP);
Makoto Nawa, Shizuoka (JP);
Toshihiko Kurebayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 30 days.

(21) Appl. No.: 09/814,510

(22) Filed: Mar. 22, 2001

(65) Prior Publication Data

US 2001/0024281 A1 Sep. 27, 2001

(30) Foreign Application Priority Data

Mar. 24, 2000 (JP) .................................... P2000-088490

(51) Int. Cl.[7] ............................................. G01B 11/14
(52) U.S. Cl. ..................... 356/614; 356/622; 356/615; 356/623; 356/621
(58) Field of Search ............................... 356/614, 622, 356/28.5, 502, 621

(56) References Cited

U.S. PATENT DOCUMENTS

| | | | | |
|---|---|---|---|---|
| 4,729,660 A | * | 3/1988 | Tsumura et al. ............ 356/622 |
| 4,855,915 A | * | 8/1989 | Dallaire ...................... 180/169 |
| 4,986,663 A | * | 1/1991 | Cecchi et al. ................ 356/622 |
| 5,812,267 A | * | 9/1998 | Everett, Jr. et al. ......... 356/614 |
| 6,118,539 A | * | 9/2000 | Gaumont et al. ........... 356/614 |

* cited by examiner

*Primary Examiner*—Michael G. Lee
*Assistant Examiner*—Ahshik Kim
(74) *Attorney, Agent, or Firm*—Fish & Richardson P.C.

(57) ABSTRACT

A position measuring laser apparatus includes first and second laser transmitter-receivers and a position measure. The laser transmitter-receiver includes a laser beam emitter for emitting a laser beam, and a laser beam receiver for receiving a laser beam resulting from the emitted laser beam reflected from a reference reflecting mirror. An optical axis of the laser transmitter-receiver is oriented at a required angle toward a moving body. The position of the moving body with respect to the reference reflecting mirror is measured based on a beam receiving signal of the laser beam obtained by the laser transmitter-receiver. The position measure compares a drive signal for driving the laser beam emitter with a beam receiving signal generated by the laser beam receiver to measure the position of the moving body based on the beam receiving signal when the drive signal and the beam receiving signal coincide with each other.

12 Claims, 8 Drawing Sheets

POSITION MEASURING LASER APPARATUS

BACKGROUND OF THE INVENTION

1. Field of the Invention

The present invention relates to a position measuring laser apparatus for measuring the position of an unmanned moving vehicle to control its course.

2. Description of the Related Art

An unmanned moving vehicle repeatedly moved between locations is used in work area such as a mine. For example, an operator first operates a vehicle to move in a predetermined course. The vehicle's position is measured by a GPS (global positioning system). The measured position is stored as a target position in memory. Thereafter, the moving vehicle is allowed to move without any assistance of the operator. The GPS measures and compares the position of the moving vehicle with the target position stored in memory. Consequently, a vehicle-mounted computer controls the operation of the unmanned moving vehicle based on the difference between the measured position and the target position. This enables the unmanned moving vehicle to automatically move toward the target position.

However, the GPS introduces errors within a certain range, and therefore, it is difficult to control the movement of the unmanned moving vehicle accurately. To eliminate the GPS errors and correct the position of the unmanned moving vehicle, a position measuring laser apparatus for measuring the position of the unmanned moving vehicle is introduced. The apparatus is coupled with the GPS system to achieve highly accurate movement of the unmanned vehicle.

Figure 8A:
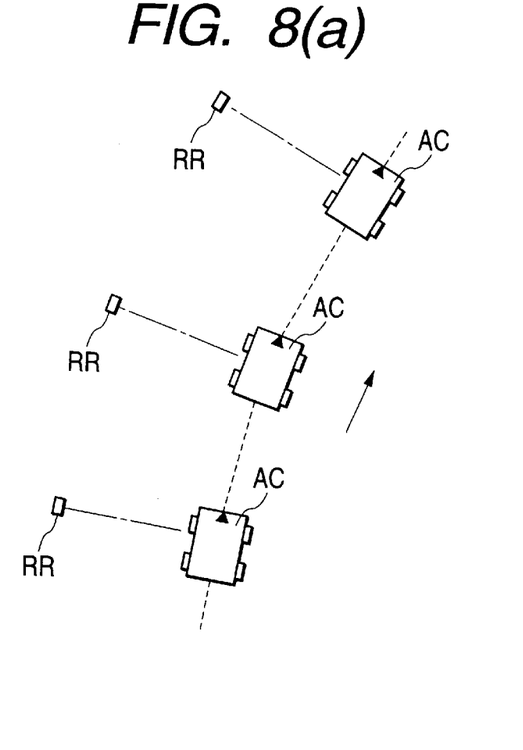
FIGS. 8(a) and 8(b) are views illustrating control of an unmanned moving truck by the position measuring laser apparatus according to the present invention.
Figure 8B:
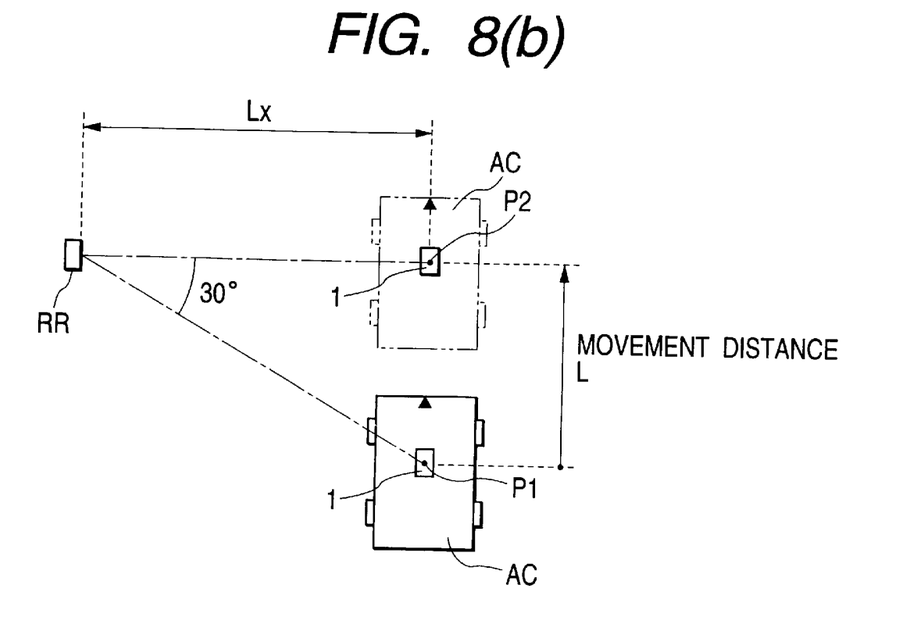

FIGS. 8(a) and 8(b) illustrate the measurement and correction of the position of an unmanned moving vehicle using the position measuring laser apparatus. For example, an unmanned truck AC has a position measuring laser apparatus 1 mounted. The apparatus can emit laser beams at a required angle in two directions and can detect each of laser beams incident in the two directions. Furthermore, retroreflectors RR are provided at specific intervals for reflecting the incident laser beam at an angle of 180° in a direction along a moving course of the unmanned truck AC. As indicated by a solid line of FIG. 8(b), the position measuring laser apparatus 1 emits a laser beam forward at the required angle and then detects the laser beam reflected from the retroreflector RR. Moreover, as indicated by a chained line of FIG. 8(b), when the unmanned truck AC moves by a predetermined distance, the position measuring laser apparatus 1 emits a laser beam sideways and then detects the laser beam reflected from the retroreflector RR. Consequently, the position of the unmanned truck AC with respect to the retroreflector RR can be calculated by a trigonometric relation using a movement distance L of the unmanned truck AC and the angle defined by the two laser beams. In this manner, as shown in FIG. 8(a), the direction of the unmanned truck AC is controlled while the position is detected so that the detected position coincides with the predetermined position, thus achieving highly accurate movement.

A visible light beam can be used as the laser beam. However, this may pose a problem in that the position may not be accurately detected when the position measuring laser apparatus receives a light beam other than the intended reflected laser beam. As a result, it becomes necessary to limit the detection of laser beam to that emitted from the position measuring laser apparatus for the purpose of positional detection.

Often, the moving system for the unmanned vehicle of this type is often used under extreme conditions. In particular, the position measuring laser apparatus is required to securely emit the laser beam even in hot or cold regions. Moreover, the angles of the laser beams emitted should be controlled to a high degree because a small deviation can introduce a significant error in the measured position. Additionally, the window of the apparatus through which beams are emitted or received needs to be cleaned every time it becomes dirty under the extreme conditions.

SUMMARY OF THE INVENTION

The present invention relates to a position measuring laser apparatus capable of measuring the position of an unmanned vehicle with high accuracy by eliminating any influence of an outside light beam. Furthermore, the present invention relates to a position measuring laser apparatus capable of securely measuring a position irrespective of temperatures of outside environment. Moreover, the present invention relates to a position measuring laser apparatus that can be easily set on an unmanned moving vehicle and maintained.

According to the present invention, a position measuring laser apparatus is provided with a first and a second laser transmitter-receiver, each having its optical axis oriented at a required angle toward a moving body such as an unmanned moving vehicle, each of the laser transmitter-receivers including laser beam emitting means for emitting a laser beam and laser beam receiving means for receiving a laser beam resulting from the emitted laser beam reflected on a reference reflecting mirror, in which the position of the moving body with respect to the reference reflecting mirror is measured based on a beam receiving signal indicative of each of the laser beams obtained by both of the laser transmitter-receivers. The apparatus further includes position measuring means for comparing a drive signal for driving the laser beam emitting means with a beam receiving signal generated by the laser beam receiving means for measuring the position of the moving body based on the beam receiving signal when both of the signals coincide. In particular, the position measuring means includes: means for outputting the drive signal having a required frequency to the laser beam emitting means; timing generating means for generating a timing signal to be set based on the frequency of the drive signal; coincidence detecting means for comparing the beam receiving signal with the drive signal based on the timing signal to detect the coincidence therebetween; and outputting means for outputting the beam receiving signal as an effective beam receiving signal when the coincidence is detected in sequentially predetermined times by the coincidence detecting means.

Furthermore, the position measuring laser apparatus can be implemented according to the following embodiments: first, the laser beam emitting means is constituted in the form of a laser module incorporating a laser diode therein, wherein the laser module is detachably attached to a Peltier element fixingly housed inside the laser transmitter-receiver and the optical axis of the laser module is positionally adjusted; second, the laser transmitter-receivers are fixingly supported by one fixing plate, wherein each of the laser transmitter-receivers is fixingly supported by the fixing plate by mutual engagement between projections formed at either one of the laser transmitter-receiver and the fixing plate and recessed grooves formed at the other thereof, in which the projection and the recessed groove are provided for determining an optical axis direction of each of the laser transmitter-receivers; and third, the laser transmitter-receiver is provided with a window opened for transmitting the laser beam, and a transparent plate detachably attached to the laser transmitter-receiver in front of the window.

In the position measuring laser apparatus, the drive signal output at the time of laser emission is compared with the beam receiving signal generated when the laser beam is detected. If the signals coincide with each other, that is, if the signals coincide with each other in sequentially predetermined times, the beam receiving signal is determined as from a laser beam that was emitted from the laser beam emitting means and reflected on the reference reflecting mirror. Thus, the position of the moving body can be measured with high accuracy without being influenced by other light beams. Moreover, if the first to third embodiments are used, the position can be securely measured irrespective of the outside temperatures. Also, the position measuring laser apparatus can be easily set with respect to the unmanned moving vehicle for easy maintenance.

DETAILED DESCRIPTION OF THE PREFERRED EMBODIMENTS

Figure 1:
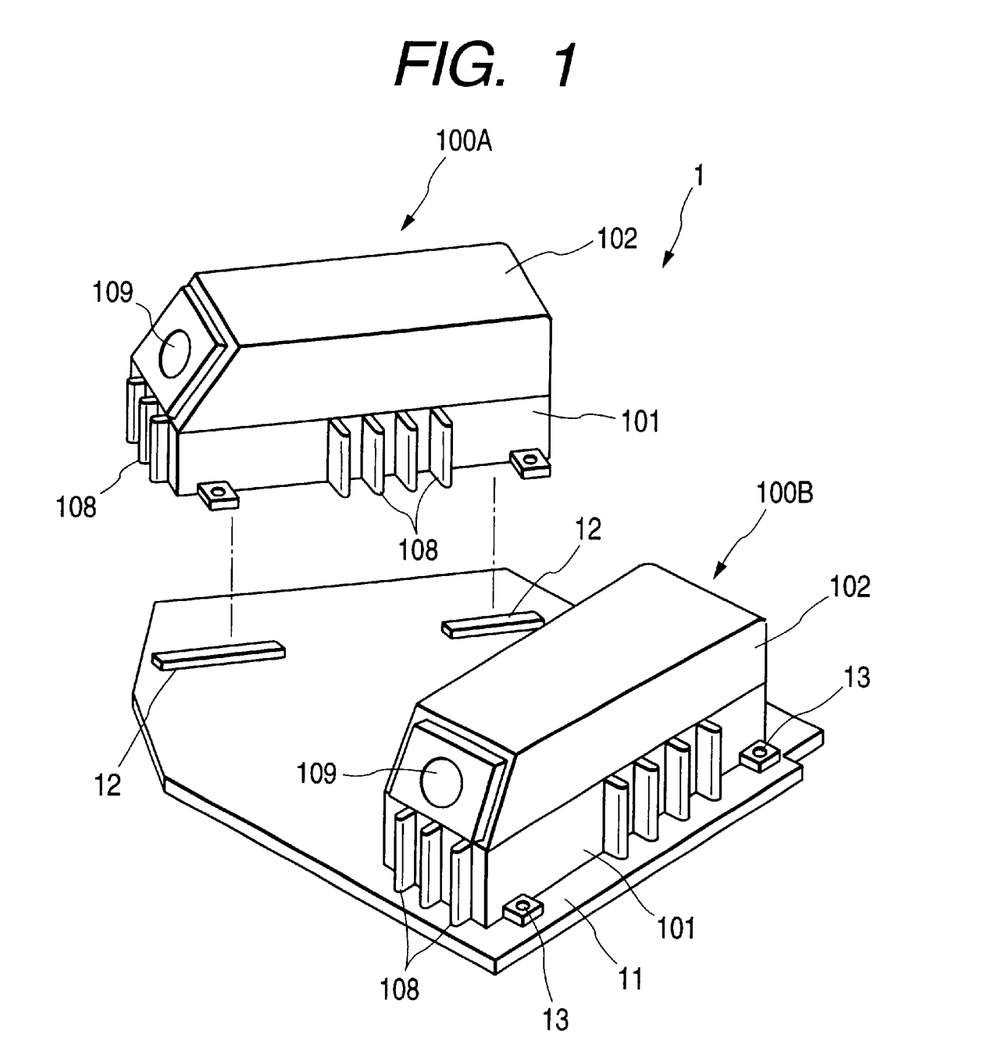
FIG. 1 is a perspective view showing a general configuration of a position measuring laser apparatus according to the present invention.
Figure 2:
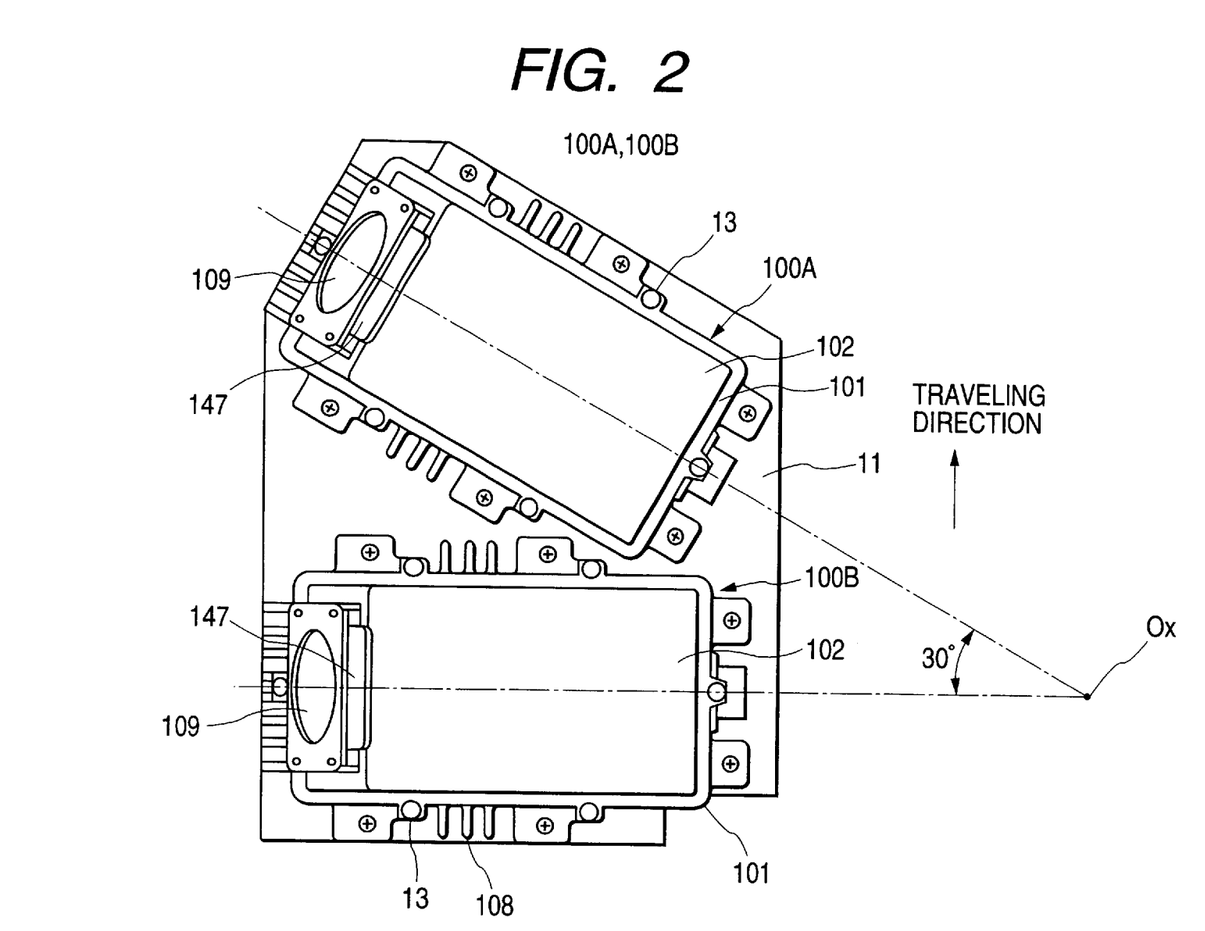
FIG. 2 is a plan view of the position measuring laser apparatus shown in FIG. 1.

A preferred embodiment according to the present invention will be described below in reference to the accompanying drawings. FIG. 1 is a partly exploded view showing the general configuration of a position measuring laser apparatus according to the present invention. FIG. 2 is a plan view of the assembled position measuring laser apparatus, which is installed in the unmanned truck AC illustrated in FIGS. 8(a) and 8(b). The position measuring laser apparatus 1 includes first and second laser transmitter-receivers 100A and 100B, each of which is fixingly supported onto a firm fixing plate 11 formed of a metal plate or the like via screws 13 inserted at the reverse of the fixing plate 11. The fixing plate 11 is mounted horizontally in part of the above-described unmanned truck, wherein projection keys 12 are disposed at a portion where the first laser transmitter-receiver 100A is fixingly supported to extend forward at an angle of 30° with respect to a direction perpendicular to a moving direction of the unmanned truck. The projection keys (not shown) are disposed to similarly extend toward the direction perpendicular to the moving direction at a portion where the second laser transmitter-receiver 100B is fixingly supported.

The first and second laser transmitter-receivers 100A and 100B have the same configuration. Each of the laser transmitter-receivers 100A and 100B emits a laser beam through a window 109 disposed at the front surface thereof, and receives the laser beam reflected on the retroreflector RR illustrated in FIGS. 8(a) and 8(b). The first laser transmitter-receiver 100A is located with the optical axis thereof oriented at an angle of 30° in a direction perpendicular to the moving direction of the unmanned truck AC on a horizontal plane. A reference point Ox on the unmanned truck is referred to as a vertex. The second laser transmitter-receiver 100B is located with the optical axis thereof oriented in the direction perpendicular to the moving direction.

Figure 3:
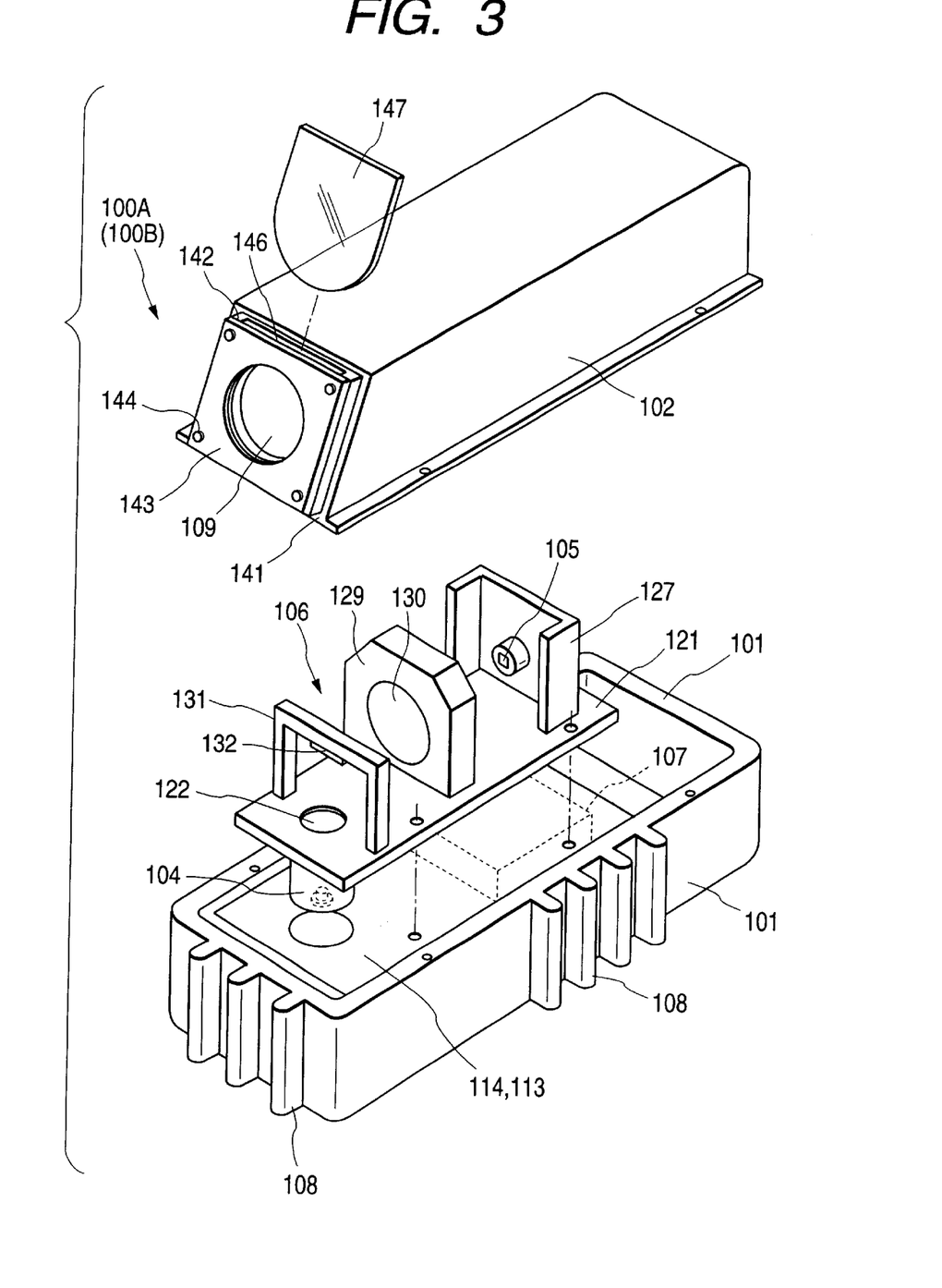
FIG. 3 is a perspective view, partly exploded, showing a laser transmitter-receiver according to the present invention.
Figure 4:
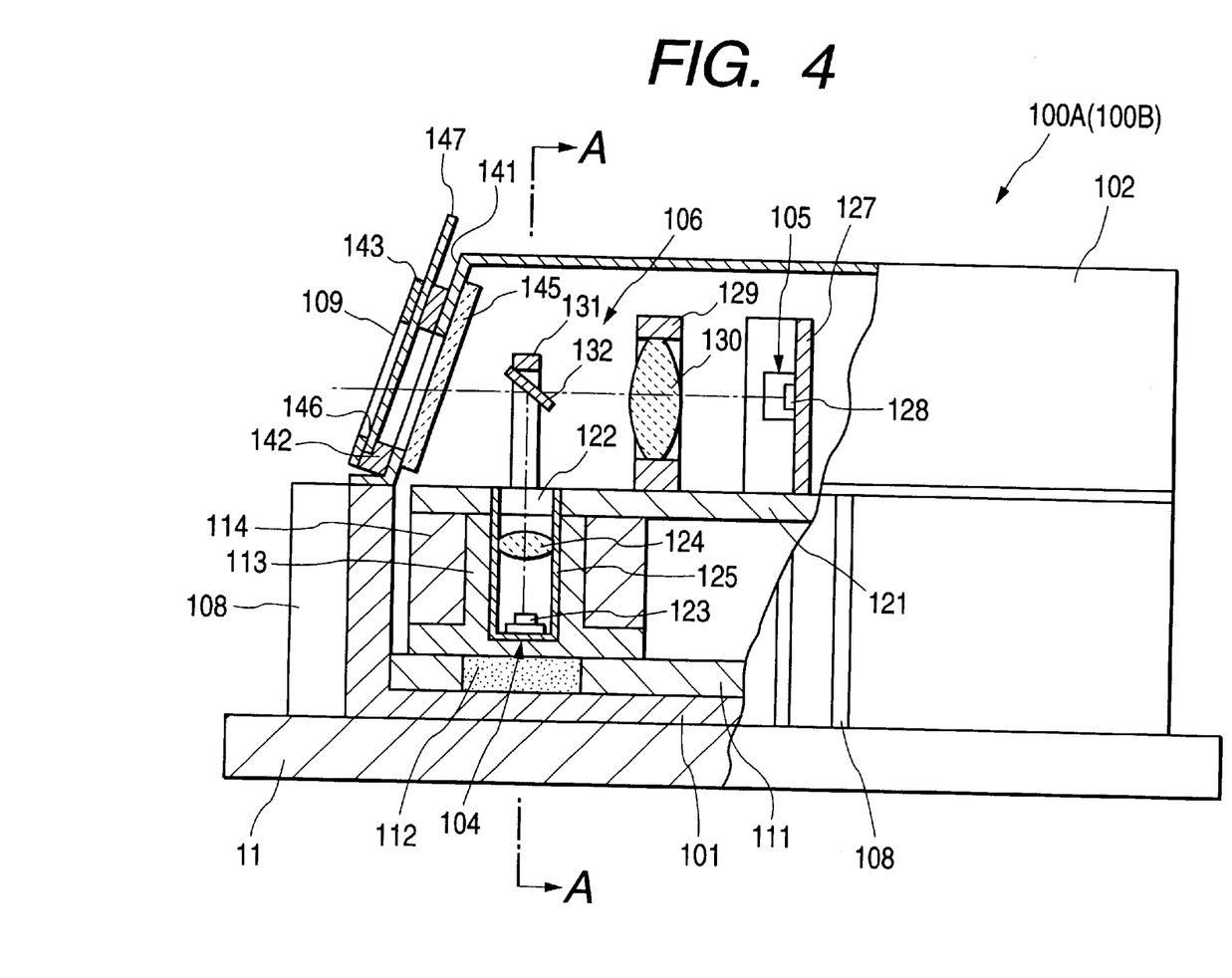
FIG. 4 is a side view showing the laser transmitter-receiver.
Figure 5:
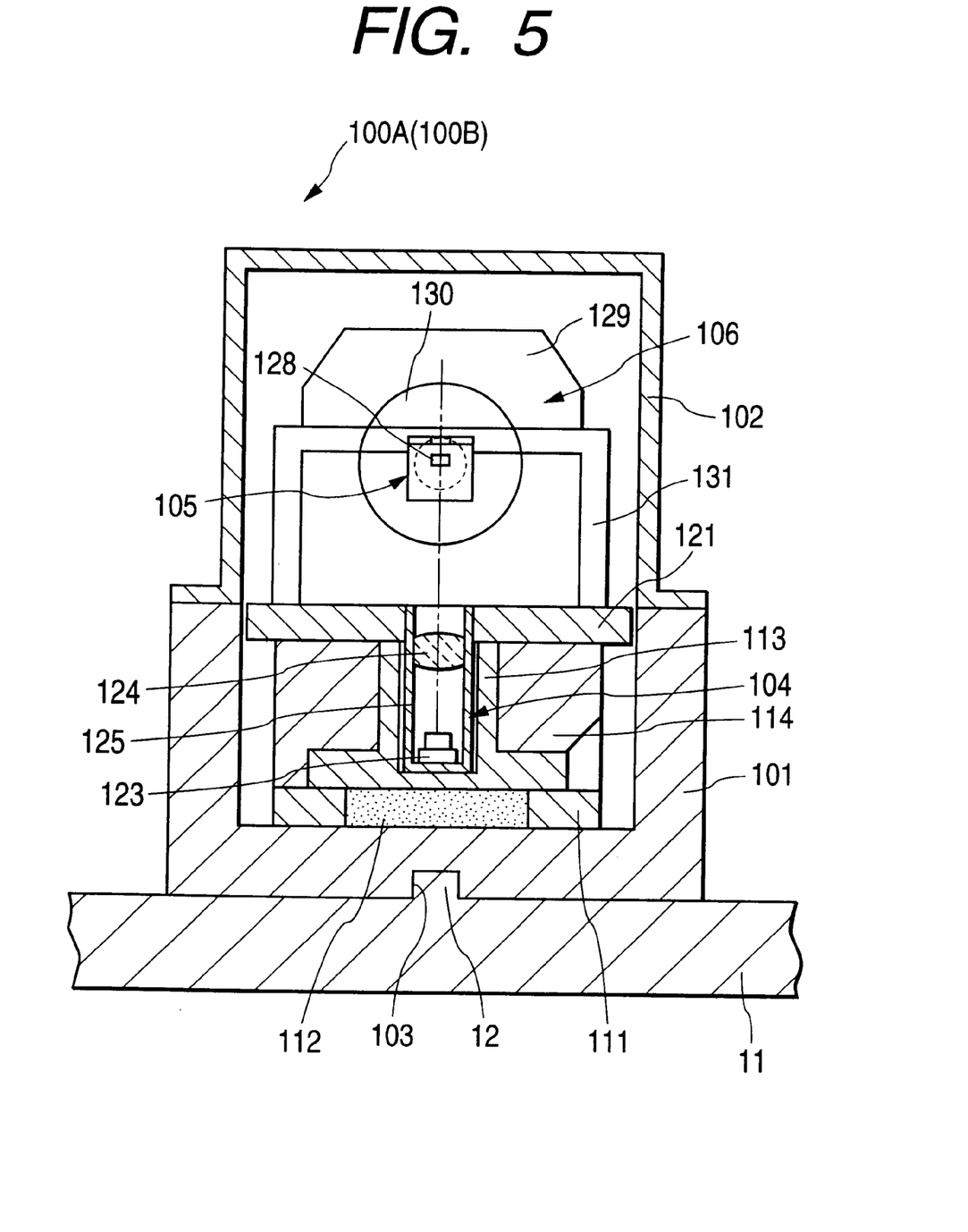
FIG. 5 is a cross-sectional view taken along a line A—A of FIG. 4.

FIG. 3 is a perspective view, partly exploded, showing the first laser transmitter-receiver 100A to explain the configuration of the first and second laser transmitter-receivers 100A and 100B. FIG. 4 is a side view showing the laser transmitter-receiver. FIG. 5 is a vertical-sectional view taken along a line A—A of FIG. 4. A casing includes a box-like base 101 and a cover 102 fixed onto the base 101 by screws (not-shown). Both of the base 101 and the cover 102 are made of metallic material such as aluminum. At the bottom of the base 101 are formed key grooves 103 extending in the direction of the optical axis to engage with the projecting keys 12 disposed at the fixing plate 11. Inside the base 101, there are integrally contained a laser module 104 for emitting a laser beam; a beam receiving module 105 for receiving the laser beam reflected on the retroreflector; an optical system 106 for projecting the laser beam emitted from the laser module 104 to the outside as a parallel optical flux and collecting the laser beam reflected on the retroreflector on the beam receiving module 105; and an internal circuit 107 for driving the laser module 104 and calculating a distance up to the retroreflector based on a signal indicative of the beam received by the beam receiving module 105. A cooling fin 108 is formed at the side surface of the base 101. The cover 102 is adapted to cover the optical system 106, the laser module 105 and the like projecting upward of the base 101, and is provided with the window 109, which transmits the laser beam emitted from or received by the optical system 106.

The base 101 is lined with a lower base plate 111 made of baking material. Furthermore, a Peltier element 112 is embedded in an opening formed at the lower base plate 111. The lower base plate 111 is secured to the inner bottom surface of the base 101 so that the Peltier element 112 is brought into contact with the inner bottom surface of the base 101. Moreover, a cooling cylinder 113 made of aluminum is erected at a position immediately above the Peltier element 112 at the upper surface of the lower base plate 111, and further, a heat insulator 114 made of foam urethane or the like is integrally provided for surrounding the cooling cylinder 113. The Peltier element 112 can control a current to regulate heating or cooling.

An upper base plate 121 made of baking material is placed on the cooling cylinder 113 and the heat insulator 114. A beam passing hole 122 is formed at the upper base plate 121, and further, the laser module 104 is supported in a downward projecting state at the lower surface of a portion at which the beam passing hole 122 is formed. The laser module 104 includes a laser diode 123 serving as a laser emitting element and a beam transmitting lens 124 for converting the laser beam emitted from the laser diode 123 into a parallel beam. The laser diode 123 and the beam transmitting lens 124 are contained inside a module cylinder 125. The laser module 104 is contained inside the cooling cylinder 113. The laser diode 123 integrally incorporates a monitoring photodiode 126, as shown in FIG. 6. The monitoring photodiode 126 can monitor part of the laser beam emitted from the laser diode 123. Here, the laser module 104 is directed vertically upward with respect to the base 101 so that its emitting optical axis crosses the optical axis of the beam receiving module 105.

At one end of the upper surface of the upper base plate 121 is integrally erected a beam receiving module holder 127, on which the beam receiving module 105 is supported. The beam receiving module 105 incorporates a beam receiving photodiode 129 serving as a laser beam receiving element. The beam receiving optical axis of the beam receiving photodiode 128 is oriented in a horizontal direction along the longitudinal direction of the upper base plate 121. At the forward end of the beam receiving module 105 at the upper surface of the upper base plate 121 is integrally erected a lens holder 129, which supports thereon a beam receiving lens 130 having an optical axis in coincidence with that of the beam receiving photodiode 128 and being capable of focusing on the beam receiving surface of the beam receiving photodiode 128. Furthermore, a mirror holder 131 is integrally erected at a position forward from the beam receiving lens 130 at the upper surface of the upper base plate 121, and supports thereon a reflecting mirror 132 inclined forward at an angle of 45° downward at a position where the optical axis of the beam receiving module 105 and the optical axis of the laser module 104 cross each other. The beam transmitting lens 124, the beam receiving lens 130 and the reflecting mirror 132 constitute the optical system 106. The laser diode 123 and the monitoring photodiode 126, which constitute the laser module 104, and the beam receiving photodiode 128 are connected to the internal circuit 107.

In the meantime, the cover 102 is provided with a front surface 141 slightly inclined rearward, and further, a front plate 143 is fixed to the inclined front surface 141 via a seal plate 142 by means of screws 144. The circular window 109 is formed in a region including the optical axis of the beam receiving photodiode 128 over the front plate 143, the seal plate 142 and the front surface 141 of the cover 102. A sealing glass plate 145 is attached to the inner surface of the cover 102 exposed to the window 109. The sealing glass plate 145 can transmit the laser beam emitted from the laser diode 123, and further, it is made of material having a high mechanical strength. A fine clearance 146 is defined between the seal plate 142 and the front plate 143. A transparent protecting plate 147 having an arcuate tip is freely inserted into or drawn from the clearance 146 from above. The transparent protecting plate 147 is adapted to protect the front side of the sealing glass plate 145 from sludge, sewage, dust, pebbles or the like, and therefore, it is formed of a hard plastic plate made of polycarbonate or the like.

According to the laser transmitter-receiver 100A (100B), the laser beam emitted from the laser diode 123 is converted into a parallel optical flux by the beam transmitting lens 124 to be directed vertically upward and then is reflected in the horizontal direction by means of the reflecting mirror 132. The beam is then emitted outside through the sealing glass plate 145, the window 109 and the transparent protecting plate 147. The laser beam reflected from the retroreflector passes through the transparent protecting plate 147, the window 109 and the sealing glass plate 145 in reverse order as described above. Then, the laser beam passing around the reflecting mirror 132 is focused on the beam receiving photodiode 128 by the beam receiving lens 130. The beam is then received by the beam receiving photodiode 128. Part of the laser beam emitted from the laser diode 123 is received by the monitoring photodiode 126. A signal indicating detection of the beam by the beam receiving photodiode 128 is processed by the internal circuit 107. Furthermore, each of the first and second laser transmitter-receivers 100A and 100B processes the signal. The distance up to the retroreflector can then be calculated based on trigonometry.

Figure 6A:
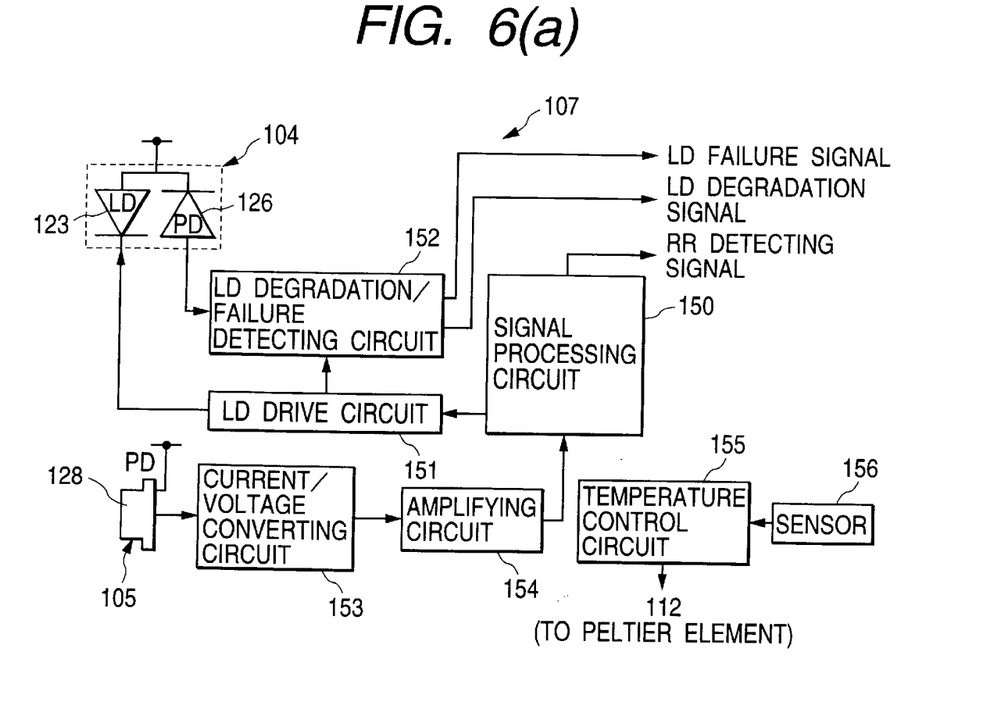
FIGS. 6(a) and 6(b) are block diagrams illustrating an internal circuit and a signal processing circuit, respectively.

FIG. 6(*a*) is a block diagram illustrating the internal circuit 107. An LD drive circuit 151 connected to the laser diode 123 supplies a drive current to the laser diode 123 and then allows the laser diode 123 to emit a laser beam. Here, the LD drive circuit 151 is configured such that the laser diode 123 is driven at a drive pulse of a predetermined frequency to emit the laser beam. An LD degradation/failure detecting circuit 152 detects abnormalities of a beam emitting output from the laser diode 123 based on a beam receiving output of the monitoring photodiode 126 incorporated inside the laser module 104 and then outputs an alarm signal. The beam receiving photodiode 128 is connected in series to a current/voltage varying circuit 153 for converting a beam receiving current, as a beam receiving output from the beam receiving photodiode, into a voltage and an amplifying circuit 154 for amplifying the converted voltage. Moreover, the LD drive circuit 151 and the amplifying circuit 154 are connected to a signal processing circuit 150.

The signal processing circuit 150 supplies a drive pulse as a drive signal to the LD drive circuit 151 and receives a beam receiving signal amplified by the amplifying circuit 154 from the beam receiving photodiode 128. The circuit 150 produces an RR (recurrent reflecting) detecting signal based on the detection that the laser beam emitted from the laser transmitter-receivers 100A or 100B is reflected from the retroreflector to be received by the beam receiving photodiode 128 based on the beam receiving signal. This RR detecting signal is produced from each of the first and second laser transmitter-receivers 100A and 100B, and then, sent into a position measuring circuit, not shown. The distance between the unmanned truck with the laser transmitter-receivers 100A and 100B and the retroreflector is calculated based on trigonometry. Thus, the position of the unmanned truck can be measured. The internal circuit 107 is provided with a temperature control circuit 155 for controlling a current supplied to the Peltier element 112 to regulate the temperature of the Peltier element 112. The temperature control circuit 155 is connected to a temperature sensor 156 capable of controlling the temperature of the laser module 104, in particular, the temperature of the laser diode 123 to a predetermined value.

Figure 6B:
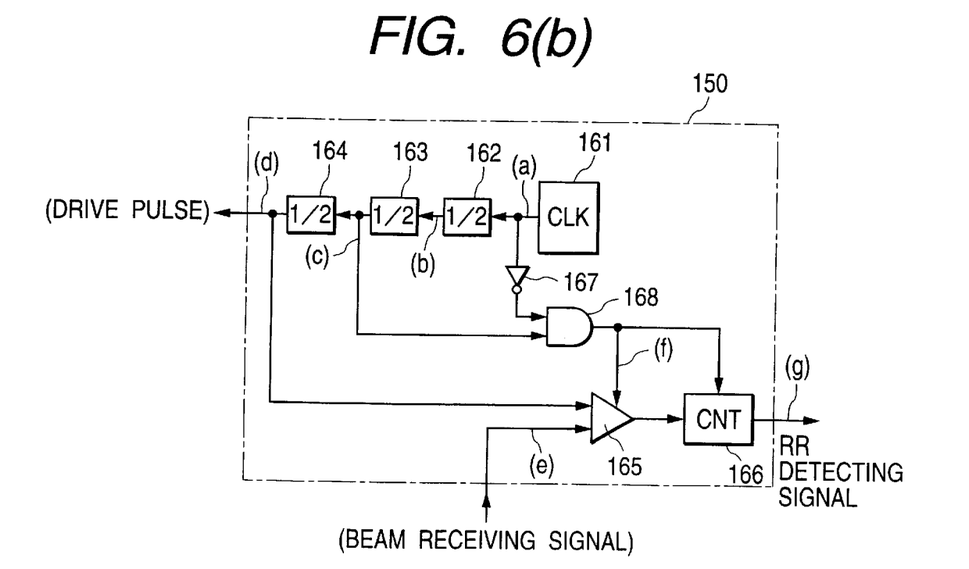

As illustrated in FIG. 6(*b*), the signal processing circuit 150 is provided with a clock generator 161 for generating a basic clock signal having a frequency of 1.666 MHz, and three dividers 162, 163 and 164 at a first stage to a third stage, respectively, for sequentially dividing the generated basic clock signal into ½. A third-stage clock signal has a frequency of 208 kHz as an output from the ½ divider 164 in the final stage. The third stage is connected to the LD drive circuit 151. Consequently, the LD drive circuit 151 intermittently controls the laser diode 123 to emit a laser beam based on the drive pulse of a frequency of 208 kHz. A timing comparator 165 is provided for comparing a second-stage clock signal as an output from the ½ divider 163 in the second stage with each signal indicating the detection of a beam by the beam receiving photodiode 128. If the signals coincide with each other, a coincidence signal is produced. The coincidence signal from the timing comparator 165 is used as the RR detecting signal. Here, a counter 166 is disposed at the output terminal of the timing comparator 165 for counting the number of coincidence signals. The counter 166 produces the RR detecting signal as soon as it counts the predetermined number of coincidence signals. Additionally, there are provided an inverter 167 for inverting the basic clock signal and an AND gate 168 for taking a logical AND of the output from the inverter 167 and the output from the ½ divider 163 in the second stage. The output from the AND gate 168 is sent to the timing comparator 165, which compares the signal levels when the output from the AND gate 168 is received.

Figure 7:
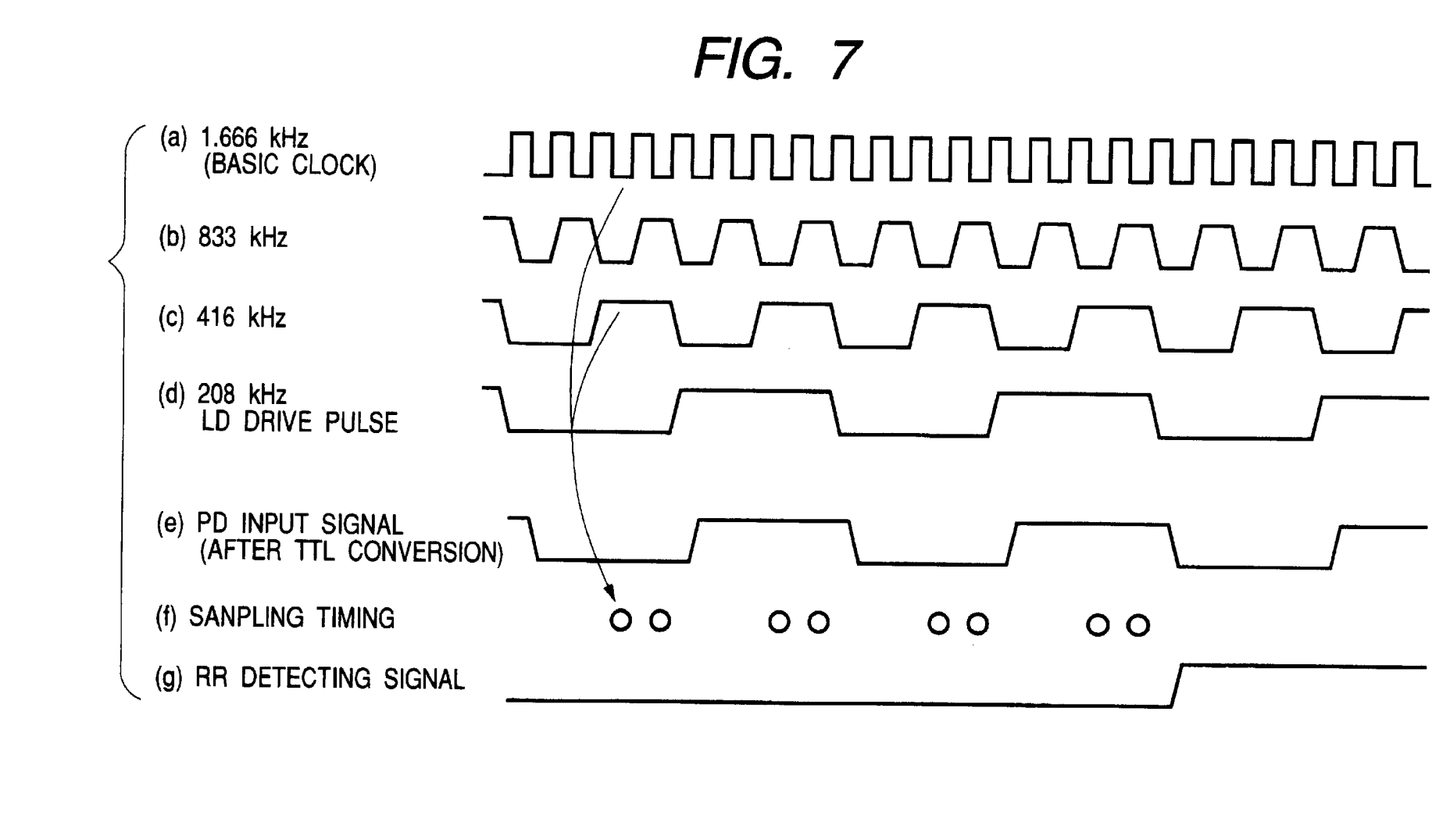
FIG. 7 is a set of timing charts illustrating the operation of a signal processing circuit.

FIG. 7 is a set of timing charts. Reference characters (a) to (g) in FIG. 7 correspond to reference characters (a) to (g) in FIG. 6, respectively. When a basic clock signal (a) is generated in the clock generator 161 in the signal processing circuit 150, the basic clock signal (a) is divided in sequence by the ½ dividers 162, 163 and 164 in the first to third stages, and then, a third-stage clock signal (d) divided into 208 kHz is sent as a drive pulse to the LD drive circuit 151. The LD drive circuit 151 drives the laser diode 123 upon receiving the drive pulse, so that the laser diode 123 flashes at a frequency of 208 kHz. Thus, the laser beam of a frequency of 208 kHz emitted from the laser diode 123 is projected toward the retroreflector from the laser transmitter-receivers 100A and 100B, to be reflected on the retroreflector and received by the beam receiving photodiode 128 in the laser transmitter-receivers 100A or 100B.

A beam receiving signal (e) is received by the beam receiving photodiode 128 and amplified up to a predetermined level by the current/voltage converting circuit 153 and the amplifying circuit 154. The signal (e) is delivered to one of the input terminals of the timing comparator 165. Then, the beam receiving signal (e) is compared with the third-stage clock signal (d) of a frequency of 208 kHz, as an output from the ½ divider 164 in the third stage to be sent to another input terminal of the timing comparator 165. The beam receiving signal (e) from the beam receiving photodiode 128 is delayed from the clock signal (d) for driving the laser diode 123 by a time required for the laser beam to go to the retroreflector and come back. Both of these signals are compared with each other at a required timing where both of the signals coincide with each other, that is, where both of the signals coincides with each other with respect to an axis of time shown in FIG. 7. The AND gate 168 takes a logical AND of a signal obtained by inverting the basic clock signal (a) by the inverter and a second-stage clock signal (c) obtained by dividing the basic clock signal by the ½ divider 163 in the second stage. Thus, the beam receiving signal (e) and the third-stage clock signal (d) are compared with each other at a timing (f) of a positive logical output from the AND gate 168. The timings are indicated by circles in the timing chart of FIG. 7. The timing comparator 165 produces a coincidence signal when both of the signals coincide with each other. The counter 166 counts the coincidence signals. When the counter 166 sequentially counts the predetermined number of coincidence signals, which is eight in this example, in response to the timing signal (f) from the AND gate 168, it generates an RR detecting signal (g) as a count-up signal. If no coincidence signal is produced, the counter 166 resets by automatically and starts counting from the beginning.

If the beam receiving signal from the beam receiving photodiode 128 coincides with the third-stage clock signal, then it is highly probable that the signal is that corresponding to the laser beam from the laser diode 123. The RR detecting signal is then produced. Thus, spurious detection by the beam receiving photodiode 128 can be prevented, and consequently, errors in distance measurements can be avoided.

When the RR detecting signal is produced from each of the two laser transmitter-receivers 100A and 100B, the position measuring circuit, not shown, measures the position of the unmanned truck upon receiving the RR detecting signal. That is, referring to FIGS. 8(a) and 8(b), the first laser transmitter-receiver 100A directed forward at an angle of 30° in the direction perpendicular to the moving direction of the unmanned truck AC detects the RR detecting signal at a point P1, based on the signal indicative of the laser beam reflected from one of the retroreflectors RR. Furthermore, the second laser transmitter-receiver 100B directed in the direction perpendicular to the moving direction of the unmanned truck AC detects the RR detecting signal at another point P2 where the unmanned truck AC travels by a predetermined distance L, based on the signal indicative of the laser beam reflected from the same retroreflector RR as described above. The distance L of the unmanned truck AC between the points P1 and P2 is measured by a chart-meter, not shown, equipped in the unmanned truck AC. A distance Lx of the unmanned truck with respect to the retroreflector RR at the point P2, that is, the relative position of the unmanned truck AC, can be measured by trigonometry using the movement distance L and an angle of 30° defined by the two laser beams. Thus, while the position is measured by the use of the laser beams with respect to the retroreflectors RR arranged along the moving course, an error introduced by the positional control of the unmanned truck AC by a GPS system is eliminated. The measured position coincides with the predetermined position. Consequently, the movement of the unmanned truck AC can be controlled with high accuracy.

In the first and second laser transmitter-receivers 100A and 100B, the Peltier element 112 can heat or cool the laser module 104 including the laser diode 123, so that the temperature control circuit 155 having incorporated therein the temperature sensor 156 controls a current to be supplied to the Peltier element 112 in accordance with the ambient temperature of the laser transmitter-receiver. The laser diode 123 is thus controlled at a proper temperature. Therefore, even in a hot or cold region, the position correcting laser apparatus can control the position of the vehicle with high accuracy. In the present embodiment, the circular cooling cylinder 113 is located at the upper surface of the lower base plate 111 mounting thereon the Peltier element 112, and further, the laser module 104 incorporated inside the cooling cylinder 113 is supported on the upper base plate 121 disposed above the lower base plate 111. The upper base plate 121 is finely positioned inside the cooling cylinder 113 in fixing the upper base plate 121 onto the lower base plate 111. This allows adjusting the position of the optical axis of the laser module 104 with high accuracy. Therefore, the laser module 104 is brought into contact with the Peltier element 112, thereby controlling its temperature In the meantime, the position of the laser module 104 can be adjusted independently of the Peltier element 112. As a consequence, the optical system can be aligned with high accuracy in order to adjust the optical axes of the laser transmitter-receivers 100A and 100B, normally with an angular accuracy of ±0.1° in the horizontal direction of the laser beam with a deviation of ±1.7 cm forward by 10 m.

Moreover, although the first and second laser transmitter-receivers 100A and 100B are fixingly supported by the fixing plate 11 equipped in the unmanned truck AC, the fixing plate 11 is provided with the projecting keys 12 for positioning in the direction perpendicular to the moving direction of the unmanned truck and at an angle of 30° in the vertical direction, respectively. The key grooves 103 formed at the bottom surface of the base 101 of each of the laser transmitter-receivers 100A and 100B are fixed in engagement with the projecting keys 12, thereby easily setting the optical axis of each of the laser transmitter-receivers 100A and 100B with high accuracy. Thus, relative errors can be prevented from being introduced in the optical axis direction between the laser transmitter-receivers 100A and 100B and the accuracy in the positional measurement can be enhanced.

The window in each of the laser transmitter-receivers 100A and 100B may be soiled under natural conditions over time to lose transparency. In such a case, the transparent protecting plate 147 held between the seal plate 142 and the front plate 143 can be disposed in front of the sealing glass plate 145, so that the transparent protecting plate 147 per se becomes dirty. The transparent protecting plate 147 is drawn from the clearance 146 and can be replaced with a new transparent protecting plate 147 when it is dirty to maintain proper transmission of the laser beam.

Although, in the present embodiment, the optical axis of each of the first and second laser transmitter-receivers 100A and 100B is inclined at an angle of 30°, the angle does not have to be limited to such a value. Moreover, the circuit configuration of the signal processing circuit incorporated in the internal circuit is not restricted to that in the present embodiment as long as it has means or a circuit configuration effective in determining the coincidence between the clock signal and the receiving signal.

The position measuring laser apparatus according to the present invention compares the drive signal at the time of the emission of the laser beam with the beam receiving signal obtained upon receiving the laser beam, and then, determines the beam receiving signal as the laser beam emitted from the laser beam emitting means and reflected on the reference reflecting mirror when the signals coincide with each other, preferably, when the signals coincide with each other in sequentially predetermined times. Thus, the position of the moving body can be measured based on the signal indicative of the laser beam emitted from the laser transmitter-receiver without the error introduced by spurious beams. Consequently, it is possible to measure the position of the moving body with high accuracy. Furthermore, the position measuring laser apparatus according to the present invention can securely measure the position irrespective of the outside temperature. It can further be easily set and maintained with respect to the unmanned moving vehicle.

The present invention claims priority from Japanese patent application serial no. 2000-088490, which is incorporated herein by this reference in its entirety.

Other implementations are within the scope of the following claims.

What is claimed is:

1. A position measuring laser apparatus comprising:
   a first laser transmitter-receiver and a second laser transmitter-receiver, each including:
      a laser beam emitter for emitting a laser beam;
      a laser beam receiver for receiving a laser beam resulting from the emitted laser beam reflected from a reference reflecting mirror,
   a position measuring circuit including:
      a first output portion for outputting the drive signal having a required frequency to the laser beam emitter;
      a timing generator for generating a timing signal to be set based on a frequency of the drive signal;
      a coincidence detector for comparing the beam receiving signal with the drive signal based on the timing signal, so as to detect the coincidence therebetween;
      a second output portion for outputting an effective beam receiving signal when the coincidence is detected in sequentially predetermined times by the coincidence detector,
   wherein an optical axis is oriented at a required angle toward a moving body, and the position of the moving body with respect to the reference reflecting mirror is measured based on a beam receiving signal of each of the laser beams obtained by said first and second laser transmitter-receiver;
   further wherein the position measuring circuit measures the position of the moving body based on said effective beam receiving signal.

2. A position measuring laser apparatus according to claim 1, wherein the laser beam emitting means comprises a laser module incorporating a laser diode therein, the laser module being detachably attached to a Peltier device fixingly housed inside the laser transmitter/receiver and being positionally adjusted.

3. A position measuring laser apparatus according to claim 1, wherein the first and second laser transmitters/receivers are fixingly supported by one fixing plate, each of the laser transmitters/receivers being fixingly supported by the fixing plate by mutual engagement between projections formed at either one of the laser transmitter/receiver and the fixing plate and recessed grooves formed at the other thereof, in which the projection and the recessed groove are provided for determining an optical axis direction of each of the laser transmitters/receivers.

4. A position measuring laser apparatus as according to claim 1, wherein the laser transmitter/receiver is provided with a window opened for transmitting the laser beam, and a transparent plate detachably attached to the laser transmitter/receiver in front of the window.

5. A position measuring laser apparatus comprising:
   a first and a second laser transmitter/receiver, each having its optical axis oriented at a required angle toward a moving body;
   laser beam emitting means in each of the laser transmitters/receivers for emitting a laser beam;
   laser beam receiving means for receiving a laser beam resulting from the emitted laser beam reflected from a reference reflecting mirror, in which the position of the moving body with respect to the reference reflecting mirror is measured based on a beam receiving signal indicative of each of the laser beams obtained by both of the laser transmitters/receivers;
   position measuring means for comparing a drive signal for driving the laser beam emitting means with a beam receiving signal generated by the laser beam receiving means, so as to measure the position of the moving body based on the beam receiving signal when both of the signals coincide with each other;
   means for outputting the drive signal having a required frequency to the laser beam emitting means;
   timing generating means for generating a timing signal to be set based on the frequency of the drive signal;
   coincidence detecting means for comparing the beam receiving signal with the drive signal based on the timing signal, so as to detect the coincidence therebetween; and
   outputting means for outputting the beam receiving signal as an effective beam receiving signal when the coincidence is detected sequentially predetermined times by the coincidence detecting means.

6. A position measuring laser apparatus according to claim 5, wherein the laser beam emitting means comprises a laser module incorporating a laser diode therein, the laser module being detachably attached to a Peltier device fixingly housed inside the laser transmitter/receiver and being positionally adjusted.

7. A position measuring laser apparatus according to claim 5, wherein the first and second laser transmitters/receivers are fixingly supported by one fixing plate, each of the laser transmitters/receivers being fixingly supported by the fixing plate by mutual engagement between projections formed at either one of the laser transmitter/receiver and the fixing plate and recessed grooves formed at the other thereof, in which the projection and the recessed groove are provided for determining an optical axis direction of each of the laser transmitters/receivers.

8. A position measuring laser apparatus as according to claim 5, wherein the laser transmitter/receiver is provided with a window opened for transmitting the laser beam, and a transparent plate detachably attached to the laser transmitter/receiver in front of the window.

9. A position measuring laser apparatus comprising:
   a first and a second laser transmitter/receiver, each having its optical axis oriented at a required angle toward a moving vehicle;
   laser beam emitting means in each of the laser transmitters/receivers for emitting a laser beam;
   laser beam receiving means in each of the laser transmitters/receivers for receiving a laser beam reflected from a reference reflecting mirror, said laser beam receiving means causing to generate a beam receiving signal that indicates receipt of the reflected laser beam; and
   position measuring means for comparing a drive signal for driving the laser beam emitting means with a beam receiving signal generated by the laser beam receiving means, so as to measure the position of the moving body based on the beam receiving signal when both of the signals coincide with each other, wherein the position measuring means comprises:
      means for outputting the drive signal having a required frequency to the laser beam emitting means;
      timing generating means for generating a timing signal to be set based on the frequency of the drive signal;
      coincidence detecting means for comparing the beam receiving signal with the drive signal based on the timing signal, so as to detect the coincidence therebetween; and
      outputting means for outputting the beam receiving signal as an effective beam receiving signal when the coincidence is detected sequentially predetermined times by the coincidence detecting means.

10. A position measuring laser apparatus according to claim 9, wherein the laser beam emitting means comprises a laser module incorporating a laser diode therein, the laser module being detachably attached to a Peltier device fixingly housed inside the laser transmitter/receiver and being positionally adjusted.

11. A position measuring laser apparatus according to claim 9, wherein the first and second laser transmitters/receivers are fixingly supported by one fixing plate, each of the laser transmitters/receivers being fixingly supported by the fixing plate by mutual engagement between projections formed at either one of the laser transmitter/receiver and the fixing plate and recessed grooves formed at the other thereof, in which the projection and the recessed groove are provided for determining an optical axis direction of each of the laser transmitters/receivers.

12. A position measuring laser apparatus as according to claim 9, wherein the laser transmitter/receiver is provided with a window opened for transmitting the laser beam, and a transparent plate detachably attached to the laser transmitter/receiver in front of the window.

* * * * *